Sept. 22, 1959     A. B. BASSOFF     2,904,938

ARBOR

Filed May 20, 1957

INVENTOR.
ARTHUR B. BASSOFF
BY Whittemore,
Hulbert & Belknap
ATTORNEYS

United States Patent Office 2,904,938
Patented Sept. 22, 1959

2,904,938
ARBOR

Arthur B. Bassoff, Detroit, Mich., assignor to National Broach & Machine Company, Detroit, Mich., a corporation of Michigan Application May 20, 1957, Serial No. 660,410

13 Claims. (Cl. 51—168)

The present invention relates to an arbor and more particularly to an arbor designed primarily for use with a grinding wheel.

It is an object of the present invention to provide a tool supporting arbor characterized by the facility with which a tool carried thereby may be removed and replaced.

It is a further object of the present invention to provide an arbor supported at only one end but including a construction adapted to give exceptional rigidity and stability to the support.

More specifically, it is an object of the present invention to provide a support including a generally tubular portion, a rotary arbor extending completely through the tubular portion, and supported therein by bearings adjacent the ends of the tubular portion, said arbor having a radially outwardly extending portion at one end of the tubular portion of the support and also having an enlarged tubular portion extending rearwardly over the outside of the tubular portion of the support, together with a third bearing located generally intermediate the first two bearings and interposed between the free end of the enlarged tubular portion of the arbor and the outside of the tubular portion of the support.

Other objects and features of the invention will become apparent as the description proceeds, especially when taken in conjunction with the accompanying drawing, illustrating a preferred embodiment of the invention, wherein.

Figure 1:
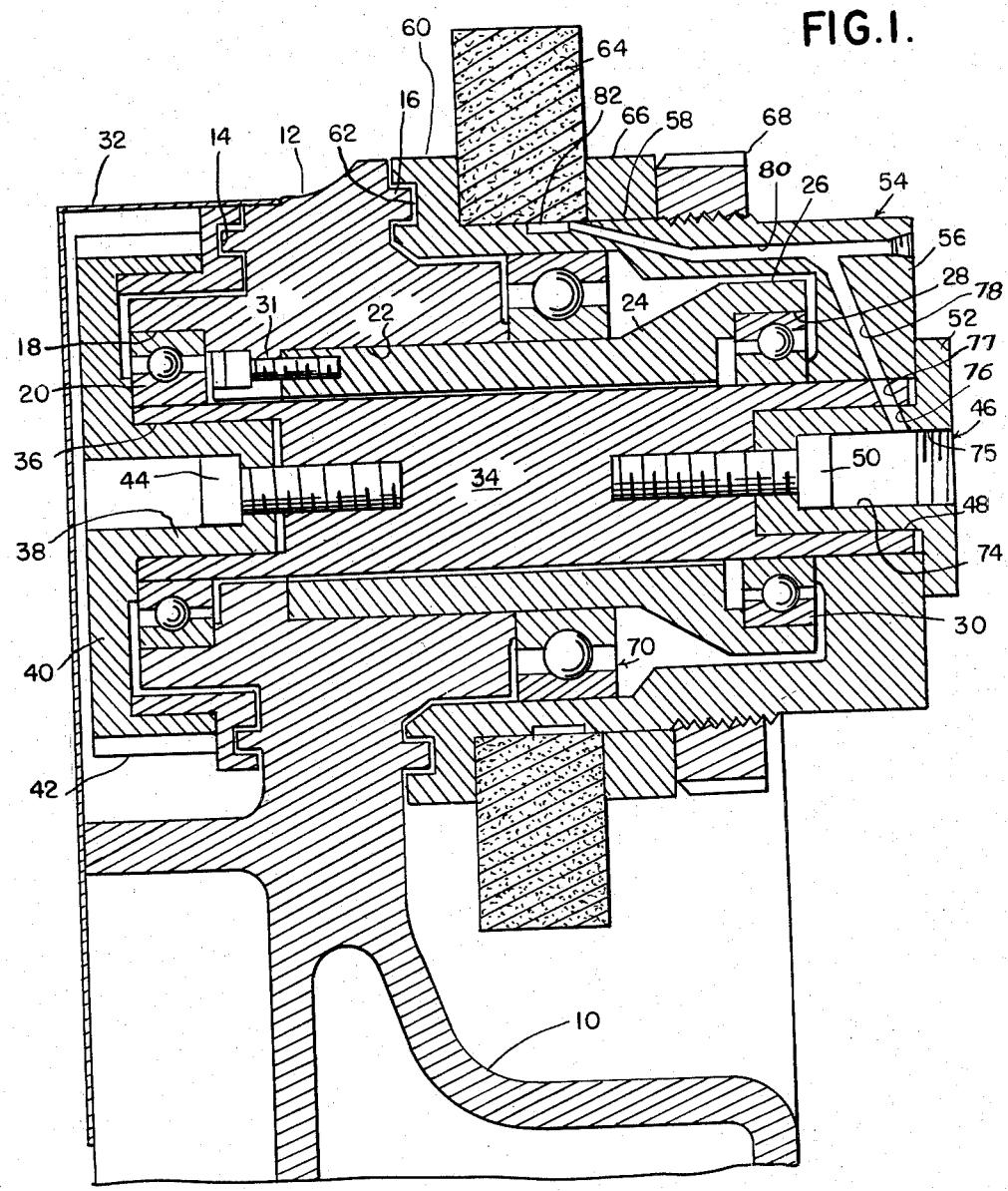
Figure 1 is a transverse sectional view through the arbor and its support.

The structure comprises a rigid support which may be in the form of an arm 10 of a grinder, the arm terminating in a generally annular enlarged head portion 12. The head portion 12 is provided with axially extending cylindrical flanges 14 and 16 to form labyrinths and at one side is recessed as indicated at 18 for the reception of a bearing 20. At its inner side the head portion is provided with a relatively deep radially enlarged recess 22 and received within this recess is a substantial length of a generally tubular extension 24, the outer end of which is enlarged as indicated at 26 and provided with an interior seat 28 for the reception of a second bearing 30. The extension 24 is firmly secured in the recess 22 by screws 31 and thus in operation constitutes a very rigid, solid, effectively integral extension thereof.

A cover plate 32 is carried by the arm. The foregoing constitutes all of the stationary parts of the structure, the remainder of the structure comprising a rotatable tool supporting arbor assembly.

Extending completely through the stationary tubular structure made up of the head 12 and its tubular extension 22 is a cylindrical arbor 34. At one end of the arbor is provided with a relatively deep cylindrical recess 36 in which is seated a hollow cylindrical extension 38 of a removable head 40 the outer surface of which constitutes a pulley and is preferably provided with teeth indicated at 42 for cooperation with similar teeth provided on a conventional timing belt. The head 40 is rigidly secured to the arbor 34 by a screw 44.

At the opposite end the arbor 34 carries a generally cup-shaped member 46 secured in a recess 48 at the end of the arbor by a screw 50. The member 46 includes a radially outwardly extending clamping flange 52. Secured to the arbor by the member 46 is the tool supporting member 54 which includes a radially outwardly extending portion 56 and an enlarged tubular portion 58 terminating in a radially outwardly extending flange 60 grooved as indicated at 62 to accommodate the flange 16 on the head. The enlarged tubular portion of the work support member 54 receives a tool such for example as the grinding wheel 64, which is retained in position against the flange 60 by a washer 66 and a single removable nut 68.

To impart rigidity to the support afforded to the tool 64, a third bearing 70 is provided which is disposed between an intermediate portion of the tubular extension 24 of the head and the interior surface of the enlarged tubular portion of the tool support member 54. Preferably, the bearing 70 is located approximately midway between the bearings 20 and 30 and desirably, it is located substantially in the plane of the tool 64.

The foregoing construction provides an extremely rugged and rigid support for the tool, this being contributed essentially by the rigidity of the tubular extension 24 of the head, and the location and relative arrangement of the bearings. Secondly, the construction is characterized in the simplicity with which the wheel may be removed and replaced, this requiring only removal of the single nut 68. This is to be contrasted with conventional grinders in which the wheel supporting spindle is engaged at both ends and requires substantial dismantling of the support structure to remove the wheel.

The arbor is shown as provided with a plurality of passages for supplying coolant to the inner periphery of the grinding wheel, which for this purpose will be made porous. Coolant may be supplied under pressure, and due to the pressure and also to the centrifugal force induced by the high rate of rotation of the grinding wheel, the coolant flows radially through the pores of the wheel. For this purpose the coolant may be introduced by a suitable coupling into the chamber 74 of the cup-shaped member 46, which for this purpose may be internally threaded as indicated at 75, and thence through passages 76, 77, 78 and 80 to the inner surface of the wheel. While only one such arrangement of passages is illustrated in Figure 1, it will be appreciated that the coolant may be brought to a plurality of circumferentially spaced points at the inner periphery of the wheel and for this purpose a plurality of the aforesaid passages may be provided. Alternatively, an annular channel 82 may be provided into which one or more channels 80 communicate, so that the coolant may be introduced around a complete annular zone at the inner periphery of the wheel.

Figure 2:
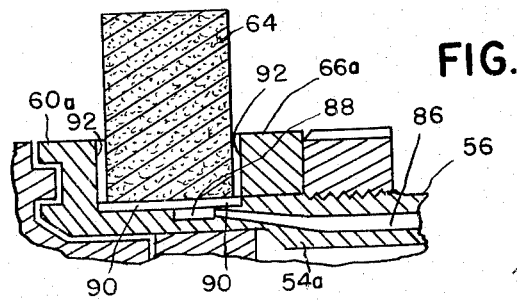
Figure 2 is a fragmentary sectional view of the wheel and a modified support.

Referring now to Figure 2 there is illustrated a modification of coolant supply. In this case the coolant is not intended to flow through a porous wheel, but instead is supplied to the sides of the wheel so that it can flow out along the sides thereof. For this purpose the wheel holder, a portion of which is indicated at 54a, includes one or more coolant passages 86 communicating with an annular channel 88 which at circumferentially spaced points communicates with axially extending passages 90, these in turn communicating with radially extending passages 92. The passages 90 and 92 may be provided at the spacing required to produce the desired distribution of coolant at the surfaces of the wheel 64.

The drawing and the foregoing specification constitute a description of the improved arbor in such full, clear, concise and exact terms as to enable any person skilled in the art to practice the invention, the scope of which is indicated by the appended claims.

What I claim as my invention is:

1. A support comprising a generally tubular portion, an arbor extending through said tubular portion, bearings in the ends of said tubular portion supporting said arbor, one end of said arbor having a radially outwardly extending portion terminating in an enlarged tubular portion overlying the outside of the tubular portion of said support, bearing means between the inside of the tubular portion of said arbor and the tubular portion of said support.

2. A rotary tool support comprising an arm terminating in a generally annular head having a tubular extension, an arbor extending completely through said head and its extension and having a radial extension and reversely extending enlarged tubular portion overlying the outside of said head and its tubular extension, bearings adjacent the ends of said arbor located within said head and its tubular extension, and a bearing disposed between the enlarged tubular portion of said arbor and the outside of said head and its extension.

3. A rotary tool support comprising an arm terminating in a generally annular head having a tubular extension, an arbor extending completely through said head and its extension and having a radial extension and reversely extending enlarged tubular portion overlying the outside of said head and its tubular extension, bearings adjacent the ends of said arbor located within said head and its tubular extension, and a bearing disposed between the enlarged tubular portion of said arbor and the outside of said head and its extension, and located substantially intermediate the bearings adjacent the ends of said arbor.

4. A rotary tool support comprising an arm terminating in a generally annular head having a tubular extension, an arbor extending completely through said head and its extension and having a radial extension and reversely extending enlarged tubular portion overlying the outside of said head and its tubular extension, bearings adjacent the ends of said arbor located within said head and its tubular extension, and a bearing disposed between the enlarged tubular portion of said arbor and the outside of said head and its extension and located substantially intermediate the bearings adjacent the ends of said arbor, and tool support means on the outside of the enlarged tubular portion of said arbor.

5. A rotary tool support comprising an arm terminating in a generally annular head having a tubular extension, an arbor extending completely through said head and its extension and having a radial extension and reversely extending enlarged tubular portion overlying the outside of said head and its tubular extension, bearings adjacent the ends of said arbor located within said head and its tubular extension, a bearing disposed between the enlarged tubular portion of said arbor and the outside of said head and its extension and located substantially intermediate the bearings adjacent the ends of said arbor, and tool support means on the outside of the enlarged tubular portion of said arbor substantially in the plane of said last named bearing.

6. A rotary tool support comprising an arm terminating in a generally annular head having a tubular extension, an arbor extending completely through said head and its extension and having a radial extension and reversely extending enlarged tubular portion overlying the outside of said head and its tubular extension, bearings adjacent the ends of said arbor located within said head and its tubular extension, and a bearing disposed between the enlarged tubular portion of said arbor and the outside of said head and its extension, said arbor at its other end having a radially enlarged pulley portion to be engaged by a driving belt.

7. A rotary tool support comprising an arm terminating in a generally annular head having a tubular extension, an arbor extending completely through said head and its extension and having a radial extension and reversely extending enlarged tubular portion overlying the outside of said head and its tubular extension, bearings adjacent the ends of said arbor located within said head and its tubular extension, and a bearing disposed between the enlarged tubular portion of said arbor and the outside of said head and its extension, said arbor at its other end having a radially enlarged toothed pulley portion to be engaged by a timing belt.

8. A grinder comprising a support having an annular head provided with oppositely extending coaxial tubular extensions, an arbor having a portion extending completely through said head and its extensions and having at opposite ends thereof radial extensions which at their radial outer edge are provided with axially inwardly extending tubular portions which surround the said tubular extensions and terminate adjacent the axially outwardly facing sides of said head, and interfitted annular axially extending rib and groove labyrinth seals formed in the adjacent surfaces at the inner ends of said tubular arbor portions and the axially outwardly facing surfaces at opposite sides of said head, and a grinding wheel carried by one of said arbor tubular portions.

9. A grinder as defined in claim 8 in which bearings are provided at the inner side of the outer ends of said tubular extensions which support the ends of the portions of the arbor extending through said support, and a bearing is provided between the inner surface of the tubular portions of said arbor on which said wheel is mounted and the adjacent radially outwardly facing surface of said support.

10. A grinder comprising an elongated generally tubular support provided with bearings at the inside of the opposite ends thereof, an arbor comprising an elongated portion extending through said tubular support and supported therein by said bearings, said arbor having a radially extending portion at one end and an enlarged reversely extending tubular portion extending over and surrounding an intermediate portion of said tubular support, a grinding wheel mounted on the tubular portion of said arbor, and a bearing disposed between the outside of said tubular support and said tubular portion of said arbor.

11. A grinder comprising an elongated generally tubular support provided with bearings at the inside of the opposite ends thereof, an arbor comprising an elongated portion extending through said tubular support and supported therein by said bearings, said arbor having a radially extending portion at one end and an enlarged reversely extending tubular portion extending over and surrounding an intermediate portion of said tubular support, a grinding wheel mounted on the tubular portion of said arbor, and a bearing disposed between the outside of said tubular support and said tubular portion of said arbor and located generally in the plane of said wheel.

12. A grinder comprising an elongated generally tubular support provided with bearings at the inside of the opposite ends thereof, an arbor comprising an elongated portion extending through said tubular support and supported therein by said bearings, said arbor having a radially extending portion at one end and an enlarged reversely extending tubular portion extending over and surrounding an intermediate portion of said tubular support, a grinding wheel mounted on the tubular portion of said arbor, a bearing disposed between the outside of said tubular support and said tubular portion of said arbor, the other end of said arbor having a radially extending portion, and an annular driving member carried by said last mentioned radially extending portion and located substantially overlying the bearing at the corresponding end of said tubular support.

13. A grinder comprising an elongated generally tubular support provided with bearings at the inside of the opposite ends thereof, an arbor comprising an elongated portion extending through said tubular support and supported therein by said bearings, said arbor having a radially extending portion at one end and an enlarged reversely extending tubular portion extending over and surrounding an intermediate portion of said tubular support, a grinding wheel mounted on the tubular portion of said arbor, and a bearing disposed between the outside of said tubular support and said tubular portion of said arbor, said last mentioned bearing being substantially midway between said end bearings.

References Cited in the file of this patent

UNITED STATES PATENTS

| | | |
|---|---|---|
| Re. 20,457 | Sanford | July 27, 1937 |
| 483,288 | Landis | Sept. 27, 1892 |
| 640,669 | Landis | Jan. 2, 1900 |
| 796,466 | Stolzenberg | Aug. 8, 1905 |
| 905,524 | Hanson | Dec. 1, 1908 |
| 1,402,794 | Reese | Jan. 10, 1922 |
| 2,025,834 | Tantz | Dec. 31, 1935 |
| 2,044,405 | Schmidt | June 16, 1936 |
| 2,167,282 | Murphy | July 25, 1939 |